(No Model.)
E. C. A. PULS.
COTTON CHOPPER.
No. 353,463. Patented Nov. 30, 1886.
Fig: 1.
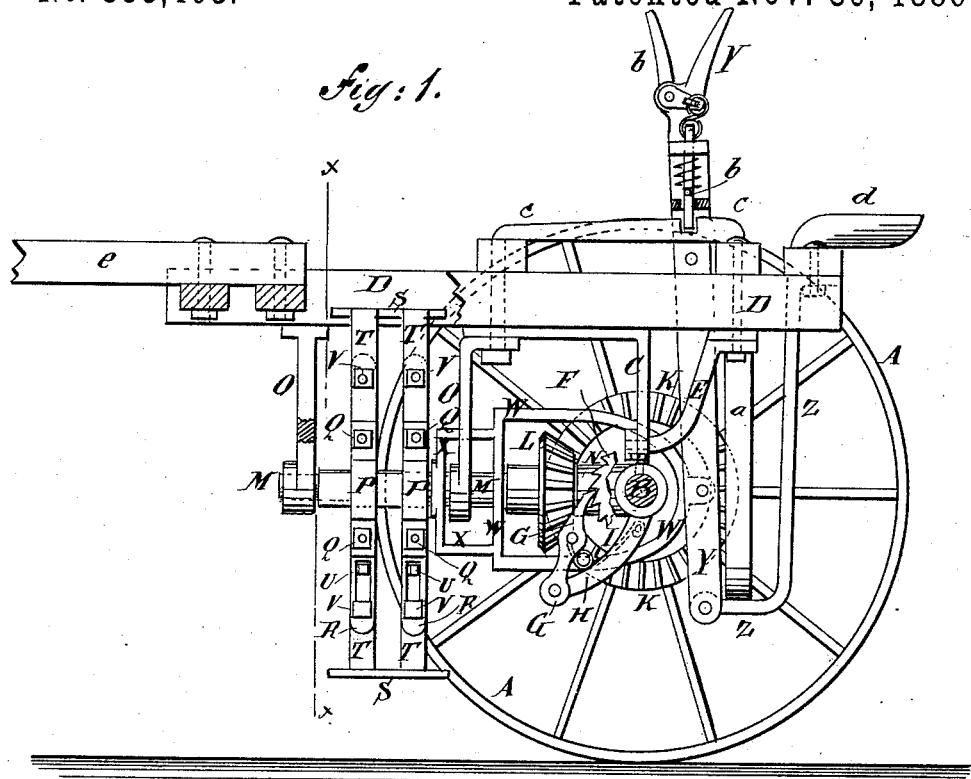
Fig: 2.
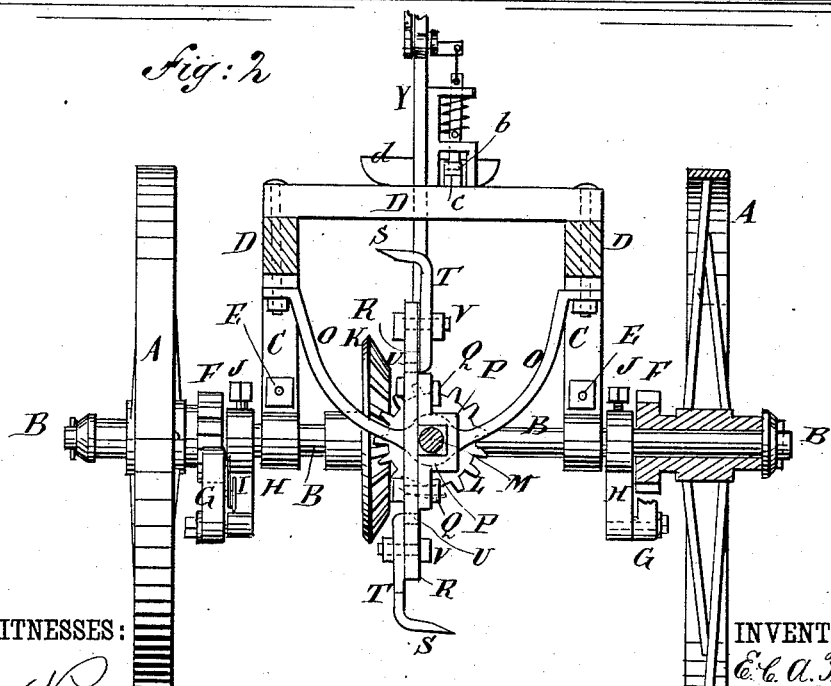
WITNESSES:
Chas Nida
C. Sedgwick
INVENTOR:
E. C. A. Puls
BY Munn & Co
ATTORNEYS.

UNITED STATES PATENT OFFICE.

ERNST C. A. PULS, OF SAN GERONIMO, TEXAS.

COTTON-CHOPPER.

SPECIFICATION forming part of Letters Patent No. 353,463, dated November 30, 1886.

Application filed June 28, 1886. Serial No. 206,475. (No model.)

*To all whom it may concern:*

Be it known that I, ERNST C. A. PULS, of San Geronimo, in the county of Guadalupe and State of Texas, have invented a new and useful Improvement in Cotton-Choppers, of which the following is a full, clear, and exact description.

Reference is to be had to the accompanying drawings, forming a part of this specification, in which similar letters of reference indicate corresponding parts in both the figures.

Figure 1 is a side elevation, partly in section and parts being broken away, of my improved cotton-chopper. Fig. 2 is a sectional front elevation of the same, taken through the line *x x*, Fig. 1.

The object of this invention is to provide cotton-choppers constructed in such a manner that the cotton will be chopped to a stand by the passage of the machine along the rows of plants, leaving the hills of plants at uniform distances apart, and which shall be simple in construction, readily controlled, and convenient in use.

The invention consists in the construction and combinations of various parts of the cotton-chopper, as will be hereinafter fully described, and then claimed.

A represents the drive-wheels, the axle B of which revolves in bearings in the lower ends of hangers C. The upper ends of the hangers C are attached to the lower sides of the side bars of the frame D, the connection being strengthened by braces E, the lower ends of which are attached to the lower parts of the said hangers, and their upper ends are attached to the said side bars.

Upon the inner ends of the hubs of the drive-wheels A are formed, or to them are attached, ratchet-wheels F, with the teeth of which engage pawls G. The pawls G are pivoted to the outer ends of arms H, and are held against the said ratchet-wheels by springs I, attached to the said arms and pawls. The inner ends of the arms H have eyes formed in them to receive the axle B, and are secured to the said axle by set-screws J, or other suitable means.

To the axle B is attached a large beveled gear-wheel, K, into the teeth of which mesh the teeth of a smaller beveled gear-wheel, L, attached to the shaft M. The rear end of the shaft M revolves and slides in a socket in the forward end of the coupling N, which has an eye in its rear end to receive and ride upon the axle B. The middle and forward parts of the shaft M revolve and slide in bearings in the centers of the curved bars O, the ends of which are attached to the side bars of the frame D.

The forward part of the shaft M is made square, and to it is secured, by bars or clasps P and bolts Q, two parallel slotted bars, R. The bars or clasps P have square recesses formed in them, to receive the square part of the shaft M and hold the bars R from turning upon the said shaft.

S are the chopping-hoes, upon which are formed, or to them are attached, shanks T, the ends of which have forwardly-projecting lugs U formed upon them, to fit into the slots of the bars R and prevent the said shanks from turning upon their fastening-bolts V. The bolts V pass through holes in the shanks T, and through the slots in the bars R, so that the hoes S can be adjusted, by loosening the nuts of the said bolts, to work deeper or shallower in the ground, as may be required.

W is a frame which passes around the axle B, the socket-coupling N, and the beveled gear-wheel L, and has a hole in its front bar to receive the shaft M. Upon the front bar of the frame W is formed, or to it is attached, a U-shaped extension-frame, X, through a hole in the forward part of which the shaft M passes. The arms of the extension-frame X are of such a length that when the forward part of the said extension-frame X is in contact with the rear bar, R, the front bar of the frame W will be in contact, or nearly in contact, with the forward end of the hub of the gear-wheel L, so that the shaft M can be moved longitudinally, to throw the gear-wheel L into and out of gear with the gear-wheel K, by moving the frame W X. The rear end of the frame W is pivoted to a lever, Y, the lower end of which is pivoted to the forwardly-projecting lower end of the hanger Z. The upper end of the hanger Z is attached to the rear cross-bar of the frame D, and the said hanger is strengthened in place by the brace-bars *a*, attached to the lower part of the said hanger and to the side bars of the frame D. With the upper part of the lever Y is connected a spring-lever pawl, *b*, which engages with a recessed catch-bar, *c*, attached to the cross-bar of the frame D, to hold the said lever Y in position. To the rear cross-bar of the frame D, or to a support attached to the said cross-bar, is secured the driver's seat *d*. To the front cross-bars of the frame D is attached the tongue *e*.

Having thus described my invention, what I claim as new, and desire to secure by Letters Patent, is—

1. The combination, with the frame D, axle B, having the bevel-gear K, and the wheels A A, of the bearings O O on the under side of frame D, the bearing N on the axle B, the shaft M, rotating and sliding longitudinally in said bearings, the cutter-bar at the forward end of the shaft, the bevel gear-wheel L at the rear end of the shaft, the frame W, extending around the said bevel-gear and bearing N, and having a forward cross-bar through which the shaft passes in front of gear L, and an extension, X, through which the shaft passes at a point adjacent to the rear side of the cutter-bar, and a pivoted lever, Y, for operating the said frame to slide the shaft M and throw the bevel-gears into and out of engagement.

2. The combination, with the shaft M, squared near its forward end, and an operating mechanism, of the parallel cutter-bars R R, slotted longitudinally at their opposite ends, the clasps P, embracing the squared part of the shaft and bolted to the bars R R, the chopping-hoes S, having two parallel shanks, T T, formed at their lower ends with lugs U U, engaging the slots in bars R R, and bolts Q Q, passed through said shanks and slotted bars, substantially as set forth.

ERNST C. A. PULS.

Witnesses:
A. HOMANN,
I. AUDRAE.